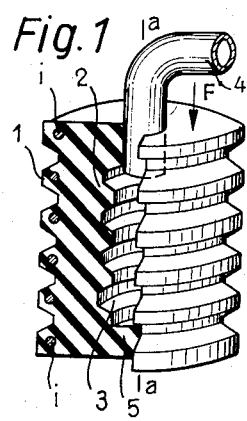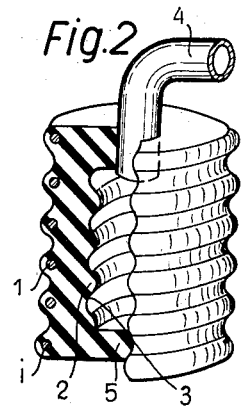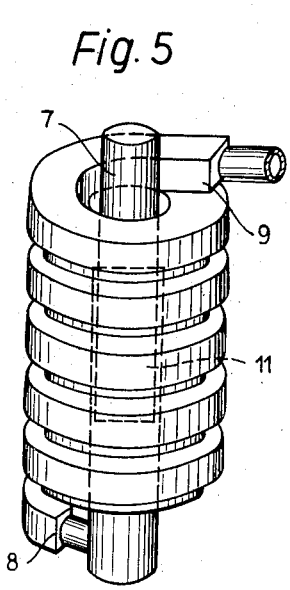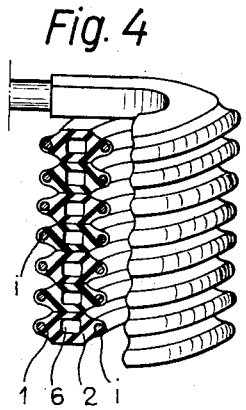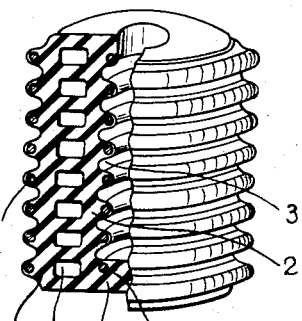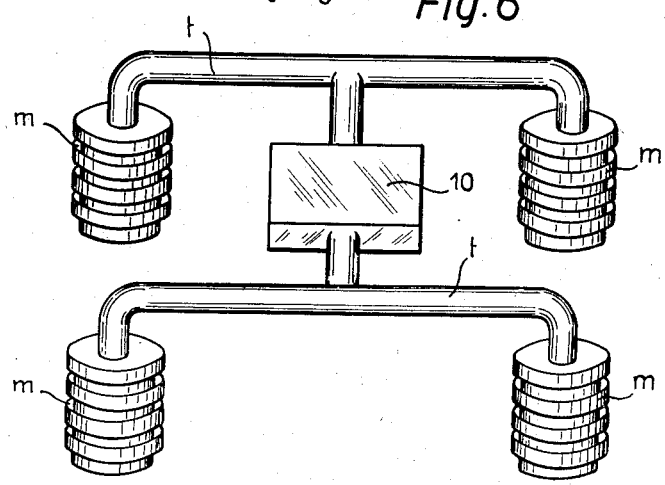
INVENTOR.
PIERLUIGI NARDI
ATTORNEY.

United States Patent Office 2,842,358
Patented July 8, 1958

2,842,358

FLUID SHOCK ABSORBER SPRINGING ASSEMBLY

Pierluigi Nardi, Milan, Italy, assignor to Societa Applicazioni Gomma Antivibranti "Saga" S. p. A., Milan, Italy, a corporation of Italy Application October 29, 1952, Serial No. 317,401

Claims priority, application Italy November 3, 1951

7 Claims. (Cl. 267—35)

Rubber springs can be made only of limited length; hence it is impossible to provide the stroke required by the modern extremely supple suspensions for automotive vehicles. From this point of view it should be borne in mind that the more flexible the springs are, the more they are inflected. Therefore, most part of their useful stroke is used up by the normal load. The tension of the springs increases with increasing compression, so that when used for higher than normal load the tension of the springs is relatively great, i. e. the springs are relatively hard, which is not desired.

The present invention proposes to overcome the aforesaid difficulties by providing a shock absorber assembly, in particular for suspensions for automotive vehicles, which assembly includes at least one body of rubber elastically deformable predominantly in the direction in which the load is applied (hereinafter called rubber spring) and a means cooperating with said body in such a manner that under normal or static load the rubber spring is not deformed. The term normal or static load defines the load on the spring when the vehicle stands still. Dynamic loads are produced when the vehicle is in motion, for example, by uneven ground, by centrifugal forces when the vehicle moves in a curve, by shocks when an aircraft hits the ground, or the like. Such dynamic loads vary and can assume considerable values.

Fig. 1 is a perspective part sectional view of a device according to the invention;

Fig. 2 is a perspective part sectional view of a modified device according to the invention;

Fig. 3 is a part sectional perspective view of another modification of the device according to the invention;

Fig. 4 is a part sectional perspective view of a further modification of the device according to the invention;

Fig. 5 is a perspective view of yet another modification of the device according to the invention;

Fig. 6 is a perspective view of yet another modification of the device according to the invention.

Fig. 1 represents a hollow substantially cylindrical rubber body forming a spring shaped like bellows, having deep external corrugations 1 and internal corrugations 2, i. e. there are circular ribs and grooves between the ribs on the longitudinal surface of the body. The vertical straight line $a$ represents the axis of stress and the arrow $f$ the direction of compresssion. A portion of the spring is cut away to expose the interior of the device. The inner cavity 3 of the spring is closed at the bottom end 5. To the upper end of the spring a pipe 4 is connected, which is in communication with a chamber (not represented) containing a fluid at such pressure that under the normal load, the rubber body or spring is not deformed because it is internally supported by the pressure of the fluid filling the cavity of the spring. When the load exceeds the normal load, the fluid pressure being constant, the excess stress is sustained by the rubber spring, which is deformed. The rubber body can expand freely in radial direction, which expansion is limited because of the provision of the annular ribs and of the general structure of the body.

Fig. 2 shows an embodiment of the invention, which differs from that shown in Fig. 1, because the hollow bellows-shaped rubber spring, has walls deeply undulated inside and outside, the undulations being rounded, in contradistinction to the angular corrugations shown in Fig. 1.

The rubber body shown in Fig. 3 differs from the bodies shown in Figs. 1 and 2 because of the provision of a cavity 6 in the form of a helical channel extending through the wall of the hollow bellows-shaped spring.

The channel 6 may be in communication with the chamber in which a fluid is held under constant pressure.

In Figures 1, 2, 3 the letter $i$ designates suitable stiffening means extending through the inactive zones of the rubber body for assisting the rubber spring against yielding in an undesired direction.

Fig. 4 represents a spring constituted by a rubber pipe wound up in the shape of a cylindrical helix, the pipe windings being adjacent to one another.

In the embodiments shown in Figs. 1 to 4 an armature $i$ of relatively inexpansible material, for example, steel wire is embedded in the rubber body. This armature is in the form of steel rings embedded in the outer ribs 1 in the devices shown in Figs. 1 and 2, preventing expansion in the radial direction.

In the devices illustrated in Figs. 3 and 4 the outer and inner ribs are helical and are reinforced by steel wires $i$, which are wound in corresponding helixes. These steel wires prevent radial deformation of the wall of the device in outward as well as in inward direction.

The steel wire reinforcements permit free axial expansion and contraction of the rubber bodies.

Fig. 5 represents a spring which is analogous to that shown in Fig. 4, in the central cavity of which is a small telescoping fluid container or pump 11, which receives fluid from one end 8 of the pipe constituting the spring, the other end 9 of the pipe communicating with the chamber (not represented) containing the fluid.

Fig. 6 represents a suspension assembly constituted by four bellows-shaped springs $m$, the interiors of which communicate through pipes $t$. A pressure equalizing chamber 10 is interposed in the piping $t$.

All the cavities are filled with uncompressible liquid so that at normal distribution load, the springs are not deformed, but when one of them is overloaded while another one or other ones are relieved, the liquid is displaced from one cavity to another, the localized overload being absorbed by the elastic deformation of the overloaded spring.

With the embodiment shown in Fig. 6, the cavity of each spring can be considered filled with fluid at constant pressure, because the volume of fluid displaced by the overloaded spring is small as compared to the total volume of the fluid which is increased by the chamber 10. Moreover, the fluid volume in the other springs, because of said displacement, is absorbed by the expansion of the other springs and, therefore, does not cause an increase of pressure.

The principle of the invention is to provide hollow bellows-shaped springs the interiors of which may be intercommunicating and which contain a fluid, which supports the normal or permanent load in such a manner that the bellows-shaped springs, relieved from the weight corresponding to the normal load present to additional loads (dynamical loads) the initial resistance and resiliency so that the additional loads can act over the whole range of the elastic deformability or flexibility of the springs. However, if the fluid under pressure were exclusively confined inside of and prevented from leaving the springs, and pressure would be applied to a bellows-spring, the increased pressure of the fluid due to the reduction of the volume of the inner cavity of the spring would be added to the reaction pressure produced by the compressed rubber material. By placing the cavity of the bellows-spring into adequate communication with another more voluminous vessel, the effect of the variation of pressure of the fluid becomes negligible and, the reaction of the fluid to the load remains constant, so that the assembly presents to the dynamical stresses only the variation of reaction of the spring. Therefore, the latter can have a much greater flexibility, increasing the overall compression stroke of the device. The outflow of fluid from the spring under pressure produces a loss of work which is recovered in the storage vessel for the fluid. Since the variation of pressure in the storage vessel is minimal, the outflown fluid is returned to the spring very smoothly. For producing the same smoothness with metal springs the return work would have to be absorbed by means of shock absorbers.

The bellows-springs afford the provision of a fluid in their interior and yield or bend over in exceptionally wide range. It should be considered that each spring, besides the tank, and other springs—if they are intercommunicating—and also the piping provide space for a great volume of fluid; the fluid storage tank may be of conventional design. If a constant pressure device (discharge valve and feeder) is provided, no storage tank is necessary, not even for non-intercommunicating bellows-springs.

Intercommunicating bellows-springs afford distribution of dynamical stress over all the intercommunicating elements, hence in the case of automotive vehicles pressure equalization is obtained and vibrations are greatly reduced.

With an automatic device for unloading the bellows-springs at the inner side of a car running in a curve, or for loading those at the outer side of the car, a correct inclination of the vehicle running in curves is obtained to overcome the effect of the centrifugal force, as well as a straightening of the position of the vehicle running on ground which is inclined transversely to the longitudinal axis of the car. A main characteristic of the bellows-springs is that owing to the ribbing and ring-reinforcing, and largely because of the particular arrangement of the walls, having strong resistance against diametral transversal deformation, the springs react to the pressure of the fluid, almost exclusively in opposition to the deformation, viz. axially. Moreover, an instantaneous enhanced reaction to greater dynamical stress is obtained from the springs because of the outflowing fluid.

What I claim is:

1. A resilient shock absorber, particularly for vehicles, comprising a substantially cylindrical body made of elastic material and being adapted to be loaded in the axial direction by a substantially constant static load produced substantially by the weight of the vehicle when the vehicle is not moving and by additional variable dynamic loads produced when the vehicle is in motion, substantially circumferential ribs and grooves between said ribs on the longitudinal outer surface of said body, reinforcing means made of relatively inexpansible material embedded in said ribs for preventing deformation of said body in the radial direction, a cavity in said body, a fluid filling said cavity, and means communicating with said cavity for maintaining said fluid under substantially constant pressure to counterbalance the static load acting on said body, the additional dynamic load being yieldingly supported by the material of which said body is made.

2. A resilient shock absorber as defined in claim 1 in which circumferential ribs and grooves are provided also on the inner surface of said body.

3. A resilient shock absorber as defined in claim 1 in which said ribs have an angular cross sectional configuration.

4. A resilient shock absorber as defined in claim 1 in which said cavity extends through said body in the form of a helical channel which is coaxial of said body and in which an axial hole is provided in the center of said body.

5. A resilient shock absorber according to claim 4 including a telescoping cylindrical container placed within and coaxially of said hole, said container being closed at one end, the other end of said container being connected with an end of said helical channel.

6. A resilient shock absorber as defined in claim 1 in which said cylindrical body is formed by a helically wound substantially tubular member made of elastic material, said fluid filling the interior of said member, said means for maintaining said fluid under substantially constant pressure communicating with the interior of said member to counterbalance the static load on said body, the additional dynamic load being yieldingly supported by the material of which said member is made.

7. A resilient shock absorber as defined in claim 1, including a plurality of substantially cylindrical bodies, each of said bodies being identical to the substantially cylindrical body specified in claim 1, a fluid pressure equalizing chamber, and conduits individually connecting the cavities of said bodies with the interior of said chamber.

References Cited in the file of this patent

UNITED STATES PATENTS

| | | |
|---|---|---|
| 170,590 | Pratt | Nov. 30, 1875 |
| 737,154 | Sayer | Aug. 25, 1903 |
| 2,038,968 | Summers | Apr. 28, 1936 |
| 2,056,106 | Kuhn | Sept. 29, 1936 |
| 2,377,170 | Morgan | May 29, 1945 |
| 2,537,634 | Brown | Jan. 9, 1951 |

FOREIGN PATENTS

| | | |
|---|---|---|
| 524,287 | Great Britain | Aug. 2, 1940 |